(12) United States Patent
Novelle et al.

(10) Patent No.: US 10,077,180 B2
(45) Date of Patent: Sep. 18, 2018

(54) BEVERAGE DISPENSING HEADS WITH LIGHTING MODULES

(71) Applicant: Cornelius, Inc., Osseo, MN (US)

(72) Inventors: Anthony Novelle, Glen Ellyn, IL (US); Steven Miller, South Elgin, IL (US); Kurt Zoellick, Oak Park, IL (US)

(73) Assignee: Cornelius, Inc., Osseo, MN (US)

( * ) Notice: Subject to any disclaimer, the term of this patent is extended or adjusted under 35 U.S.C. 154(b) by 0 days.

(21) Appl. No.: 15/403,686

(22) Filed: Jan. 11, 2017

(65) Prior Publication Data
US 2017/0349424 A1    Dec. 7, 2017

Related U.S. Application Data

(60) Provisional application No. 62/344,606, filed on Jun. 2, 2016.

(51) Int. Cl.
| | | |
|---|---|---|
| *B67D 1/08* | (2006.01) | |
| *B67D 1/00* | (2006.01) | |
| *F21V 23/04* | (2006.01) | |
| *B67D 1/16* | (2006.01) | |

(Continued)

(52) U.S. Cl.
CPC ......... *B67D 1/0872* (2013.01); *B67D 1/0021* (2013.01); *B67D 1/0044* (2013.01); *B67D 1/0085* (2013.01); *B67D 1/0875* (2013.01); *B67D 1/0888* (2013.01); *B67D 1/16* (2013.01); *F21V 23/04* (2013.01); *F21V 33/00* (2013.01);
(Continued)

(58) Field of Classification Search
CPC .. B67D 1/0872; B67D 1/0021; B67D 1/0044; B67D 1/0085; B67D 1/0875; B67D 1/0888; B67D 1/16; B67D 2001/0089; F21V 23/04; F21V 33/00; G02B 6/0021; G02B 6/0033
USPC ........................................................ 222/113
See application file for complete search history.

(56) References Cited

U.S. PATENT DOCUMENTS

| | | | |
|---|---|---|---|
| 2,528,898 A | 11/1950 | Mcilvaine | |
| 3,752,192 A * | 8/1973 | Kleppin | E03B 9/12 137/382 |
| 4,894,647 A | 1/1990 | Walden, Jr. et al. | |

(Continued)

FOREIGN PATENT DOCUMENTS

| | | |
|---|---|---|
| GB | 2353625 | 2/2001 |
| WO | 2002/010906 | 3/2000 |
| WO | 2002/088610 | 11/2002 |

OTHER PUBLICATIONS

International Search Report and Written Opinion, PCT/US2017/029051, dated Jul. 6, 2017.

*Primary Examiner* — Nicholas J Weiss
(74) *Attorney, Agent, or Firm* — Andrus Intellectual Property Law, LLP

(57) ABSTRACT

A beverage dispensing head includes a housing having a front, a rear, and a base that extends between the front and the rear. A mixing nozzle is configured to dispense a flow of beverage via the base. A valve is configured to control the flow of beverage via the mixing nozzle, and a switch is movable into and between a closed position in which the valve opens the flow of beverage via the mixing nozzle and an open position in which the valve closes the flow of beverage via the mixing nozzle. A lighting module disposed in the housing is configured to illuminate the front of the housing and the base of the housing when the switch is moved into the closed position.

16 Claims, 11 Drawing Sheets

(51) Int. Cl.
*F21V 8/00* (2006.01)
*F21V 33/00* (2006.01)

(52) U.S. Cl.
CPC ......... *G02B 6/0021* (2013.01); *G02B 6/0033* (2013.01); *B67D 2001/0089* (2013.01)

(56) References Cited

U.S. PATENT DOCUMENTS

| | | | |
|---|---|---|---|
| 5,129,548 A | | 7/1992 | Wisniewski |
| 5,193,718 A | | 3/1993 | Hassell et al. |
| 5,291,378 A | | 3/1994 | Stone |
| 5,454,406 A | * | 10/1995 | Rejret .................. B67D 1/1213 137/624.12 |
| 5,463,877 A | * | 11/1995 | Young ...................... A23G 9/22 222/146.6 |
| 5,491,617 A | | 2/1996 | Currie |
| 6,023,869 A | | 2/2000 | Durbin |
| 6,354,342 B1 | * | 3/2002 | Gagliano ............. B67D 1/0006 141/82 |
| 6,688,134 B2 | * | 2/2004 | Barton ..................... A23G 9/28 141/351 |
| 7,753,231 B2 | | 7/2010 | Giles et al. |
| 8,459,819 B2 | | 6/2013 | Martindale et al. |
| 9,409,756 B2 | | 8/2016 | Piatnik et al. |
| 2003/0089423 A1 | | 5/2003 | Barton et al. |
| 2005/0074173 A1 | | 4/2005 | Lee et al. |
| 2008/0232090 A1 | | 9/2008 | Hecht |
| 2010/0024890 A1 | | 2/2010 | Romanyszyn et al. |
| 2010/0299981 A1 | | 12/2010 | Baron et al. |
| 2012/0300441 A1 | | 11/2012 | Thomas et al. |

\* cited by examiner

BEVERAGE DISPENSING HEADS WITH LIGHTING MODULES

CROSS-REFERENCE TO RELATED APPLICATION

The present application is based on and claims priority to U.S. Provisional Patent Application Ser. No. 62/344,606 filed Jun. 2, 2016, the disclosure of which is incorporated herein by reference.

FIELD

The present disclosure relates to beverage dispensing heads, particularly beverage dispensing heads having lighting modules that illuminate portions of the beverage dispensing head.

BACKGROUND

The following U.S. Patents and U.S. Patent Application are incorporated herein by reference in entirety.

U.S. Pat. No. 6,648,185 discloses an electrically operated pre-mix valve including a cup lever operable to activate a switch to energize a solenoid. The solenoid operates a first lever, which then contacts and operates a second lever. The second lever, in turn, moves against the contact end of an actuating shaft. The actuating shaft is thereby moved to permit beverage flow through the valve and out of a nozzle thereof. The valve uses a compound lever system to gain a mechanical advantage for substantially lessening the opening force required to be applied by the solenoid.

U.S. Pat. No. 8,770,446 discloses a system and method for dispensing a predetermined portion of a beverage or drink additive using a cost effective portion control valve that replaces electrical components with mechanical components.

U.S. patent application Ser. No. 14/253,614 discloses a valve dispensing system that can be used in a beverage dispenser. In particular, the valve dispensing system has individual valve module components that control the flow of a beverage or beverage component, and a plurality of valve module components may be combined to form a system capable of dispensing a plurality of beverages and/or beverage components.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a beverage dispensing head includes a housing having a front, a rear, and a base that extends between the front and the rear. A mixing nozzle is configured to dispense a flow of beverage via the base. A valve is configured to control the flow of beverage via the mixing nozzle. A switch is movable into and between a closed position in which the valve opens the flow of beverage via the mixing nozzle and an open position in which the valve closes the flow of beverage via the mixing nozzle. A lighting module disposed in the housing is configured to illuminate the front of the housing and the base of the housing when the switch is moved into the closed position.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

Through research and experimentation, the present inventors have recognized that beverage dispensing machines with discrete post-mix beverage dispensing heads (which dispense a single type of beverage from a single nozzle) do not include apparatuses for illuminating the housing of the beverage dispensing heads, the dispensing beverage, and/or working areas (e.g. drip tray) of the dispensing machines. The present inventors have also recognized that the lights that illuminate working areas of beverage dispensing machines having multi-flavor post-mix beverage dispensing heads (which dispense different flavors of beverages from a single nozzle) are not easily integrated into beverage dispensing machines with discrete post-mix beverage dispensing heads. Through research and experimentation, the present inventors have developed the presently disclosed lighting modules, which can be coupled to the discrete post-mix beverage dispensing heads. The present inventors have developed lighting modules that are self-contained and can be connected to the existing electrical circuit that provides power to the discrete post-mix beverage dispensing head.

Prior art post-mixed beverage dispensing heads commonly used in the industry receive two independent fluids (e.g. a flavor syrup and carbonated water) and dispense a beverage formed from the two fluids. Reference is made to the above-incorporated U.S. Patent Application and U.S. Patents for further description of the components and operation of the prior art post-mixed beverage dispensing heads.

Figure 1:
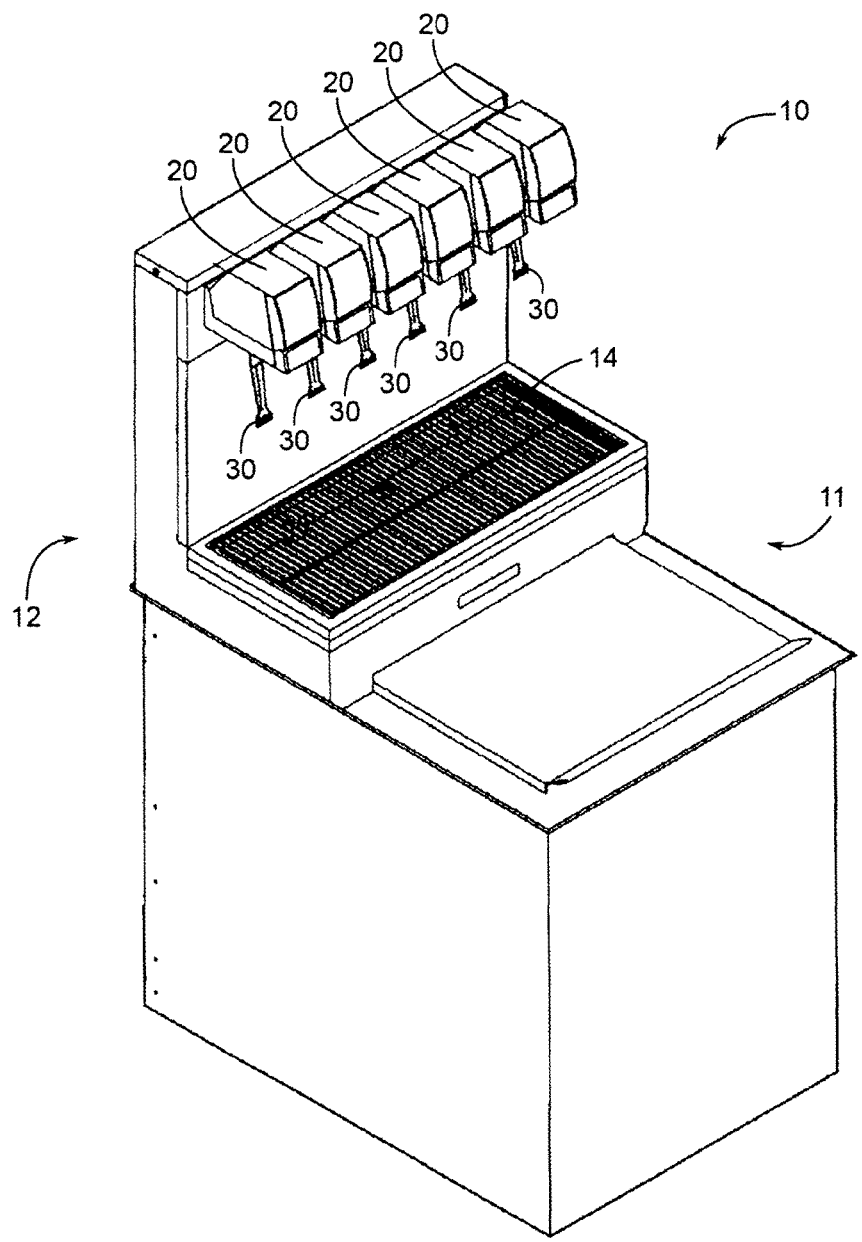
FIG. 1 is an example beverage dispensing machine.

Referring to FIG. 1, a beverage dispensing machine 10 has a plurality of post-mix beverage dispensing heads 20 for dispensing beverages to an operator. The beverage dispensing machine 10 includes a drip tray 14 for collecting any beverage that may spill during operation. The beverage dispensing machine 10 has a front side 11 for filing beverage receptacles (e.g. cups) with the beverage from the dispensing heads 20 and a rear side 12 opposite the front side 11 (which may be orientated toward a consumer). It will be recognized that each of the plurality of dispensing heads 20 in a beverage dispensing machine 10 can include any of the components and features described herein.

Figure 3:
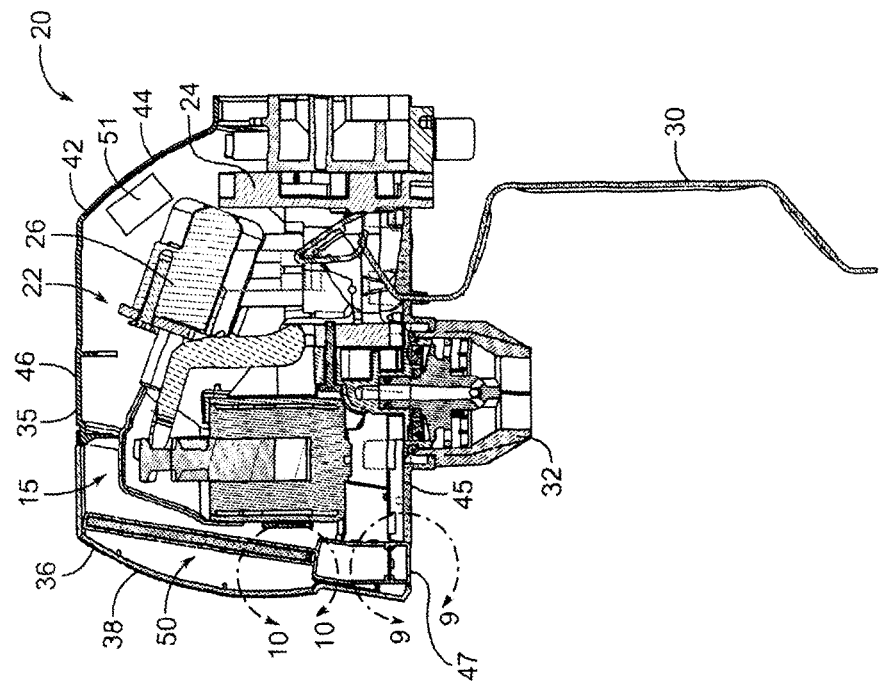
FIG. 3 is a cross section view of the dispensing head of FIG. 2 along line 3-3 in FIG. 2.
Figure 2:
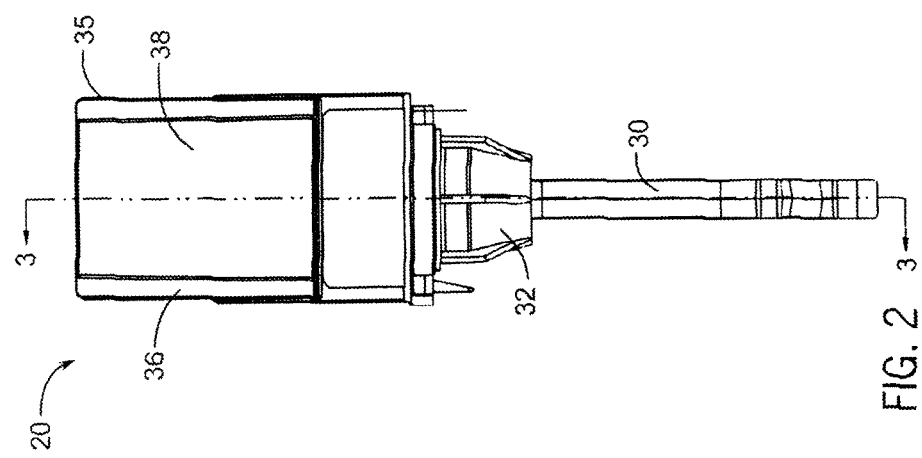
FIG. 2 is a front view of an example dispensing head.
Figure 4:
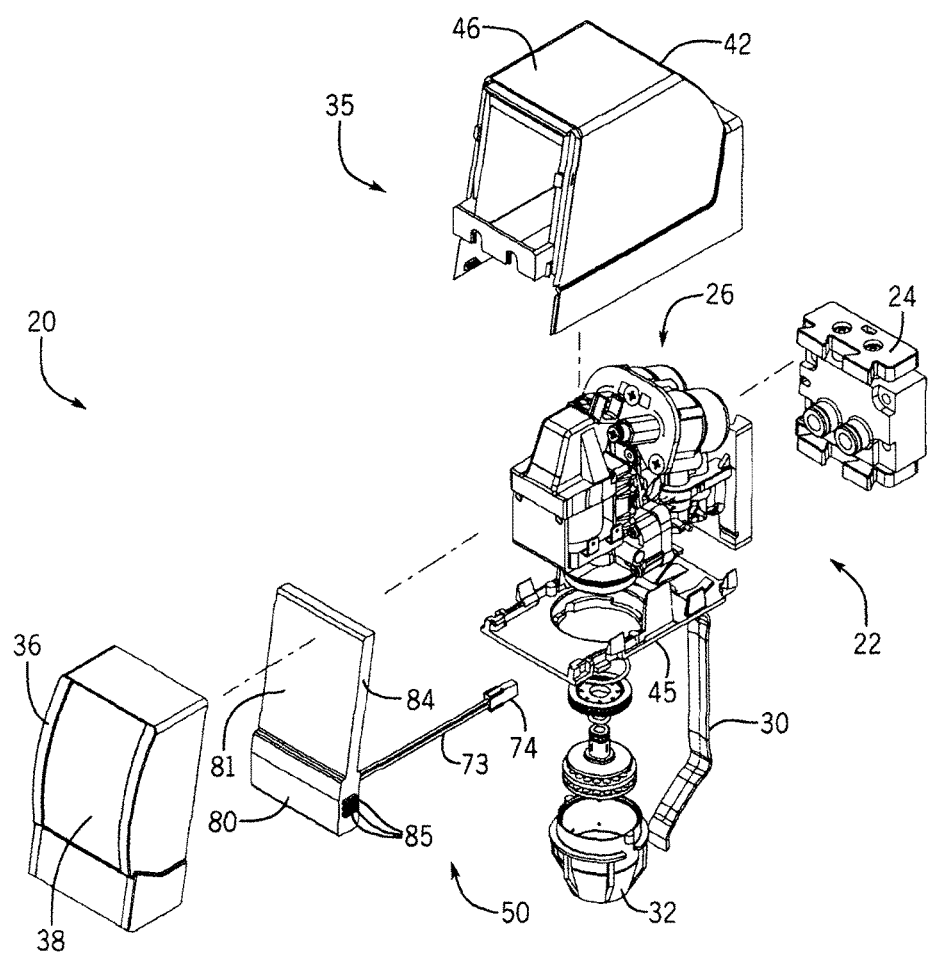
FIG. 4 is an exploded view of the dispensing head of FIG. 2.

Referring to FIGS. 2-4, each dispensing head 20 includes a housing 35 that covers and protects a valve assembly 22 (described further herein). The housing 35 includes a front 36, a rear 42 opposite the front 36, a base 45 that extends between the front 36 and the rear 42, and a top 46 opposite the base 45 that extends between the front 36 and the rear 42. The housing 35 defines a cavity 15 in which the valve assembly 22 and a lighting module 50 (described further herein) are disposed.

Figure 5:
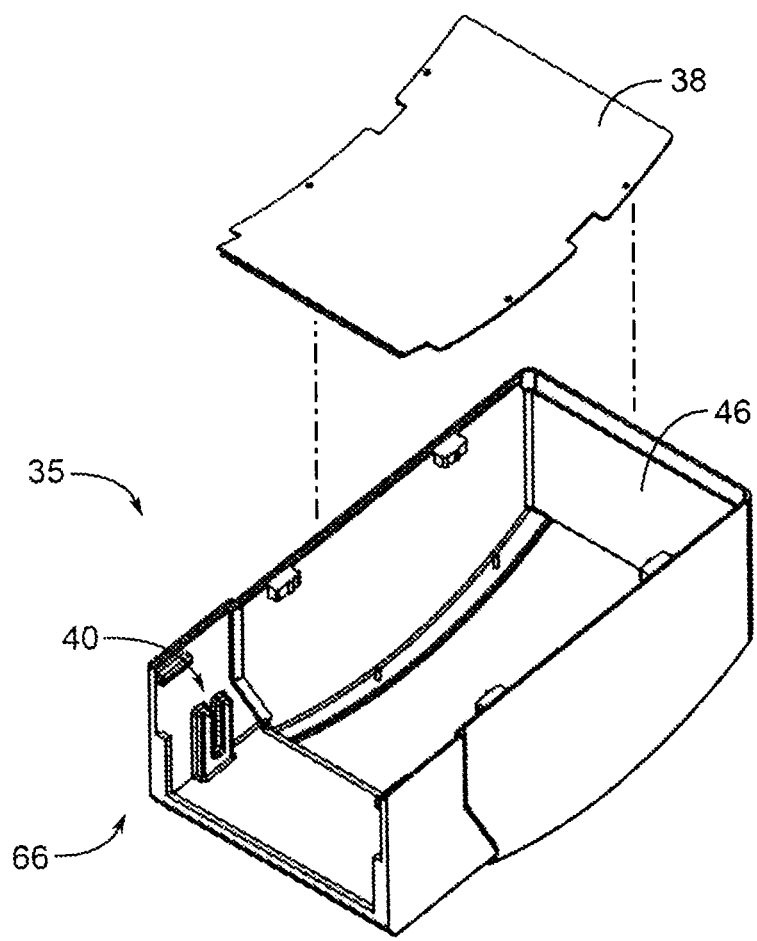
FIG. 5 is an exploded view of a front of a housing.

The front 36 is removably coupled to the dispensing head 20 and includes a display window 38 that can be either transparent or translucent. The display window 38 is removably coupled to the front 36 (FIG. 5). The display window 38 can be made of any suitable transparent or translucent material including glass, plastic, and/or the like. The display window 38 is configured to receive a graphic (e.g. an adhesive sticker) that displays indicia that corresponds to the beverage dispensed from the dispensing head 20 (e.g. an adhesive sticker having a beverage brand or flavor name (e.g. "Cherry Cola", "Diet Cola") is received on the display window 38). In certain examples, the display window 38 is curved so as to form a lens for focusing light from the lighting module 50. The front 36 is removably coupled to the dispensing head 20 such that the removal of the front 36 exposes the internal components of the dispensing head 20 (FIG. 4).

The rear 42 includes a rear display window 44 (FIG. 3) that can be either transparent or translucent. The rear display window 44 is removably coupled to the rear 42. The rear display window 44 is configured to receive a graphic, such as an adhesive sticker. The rear display window 44 can be made of any suitable transparent or translucent material including glass, plastic, and/or the like.

The base 45 includes a lighting opening 47 (FIG. 3) that is separate from the display window 38. A mixing nozzle 32 is removably coupled to the base 45 and is configured to dispense a beverage to the operator via the base 45 to the beverage receptacle.

Each dispensing head 20 further includes a valve assembly 22 (FIGS. 3-4) having a valve back block 24, a valve 26 configured to control flow of beverage through the mixing nozzle 32, and a switch 28 (FIG. 13) that is movable into and between a closed position in which the valve 26 opens the flow of beverage via the mixing nozzle 32 and an open position in which the valve 26 closes the flow of beverage via the mixing nozzle 32. The valve 26 can include any number of valves such as solenoid valves, check valves, and/or the like. Reference is made to the above incorporated U.S. Patents and U.S. Patent Application for further examples of valves for dispensing a beverage from the dispensing head 20.

Each dispensing head 20 further includes a lever 30 that extends from the base 45 of the housing 35 and is coupled to the switch 28 such that movement of the lever 30 causes the switch 28 to move to the closed position the valve 26 opens the flow of beverage via the mixing nozzle 32 and the lighting module 50 illuminates. That is, the lever 30 is configured to activate flow of beverage via the mixing nozzle 32 by moving the switch 28 to a closed position. In one example operation, a beverage receptacle is pressed against the lever 30 such that the lever 30 causes the switch 28 to move to the closed position. Reference is made to the above incorporated U.S. Patents and U.S. Patent Application for further details regarding examples of a dispense of beverage from the dispensing head 20.

Referring to FIGS. 7-11, the dispensing head 20 includes a lighting module 50 disposed in the cavity 15 (FIG. 8) defined by the housing 35. The lighting module 50 is configured to illuminate the front 36 of the housing 35 and the base 45 of the housing 35 when the switch 28 (FIG. 13) is moved into the closed position. That is, the lighting module 50 is configured to illuminate the display window 38 and/or the lighting opening 47 when the switch 28 is moved into the closed position. Illumination of the display window 38 can cause the graphic received on the display window 38 to illuminate and thereby display indicia to the operator. The lighting opening 47 is oriented toward the point of dispense of the beverage, i.e. the mixing nozzle 32, the flow of beverage into the beverage receptacle, and/or the drip tray. The illumination of the display window 38 and the lighting opening 47 can be simultaneous or sequential.

The lighting module 50 includes a first light source 61 orientated toward the display window 38 that emits light and a second light source 71 orientated toward the lighting opening 47 that emits light. The light sources 61, 71 include at least one light emitting diode (LED), and the light sources 61, 71 can include a printed circuit board.

The lighting module 50 further includes a light guide 52 that vertically upwardly guides light from the first lighting source 61 alongside the display window 38. In certain examples, the light guide 52 extends alongside a majority of the display window 38. The light guide 52 includes a front surface 53 for dispersing the light toward the display window 38 and a rear surface 54 opposite the front surface 53 that reflects light from the first light source 61 toward the display window 38 (see FIGS. 10 and 11 which include light arrows L that depict light directed toward the display window 38). The front surface 53 includes a diffuser film 63 that diffuses the light toward the display window 38. The rear surface 54 includes a reflective film 65 that reflects light from the first light source 61 toward the display window 38. The rear surface 54 has reflective properties that increase as the rear surface 54 extends away from the first light source 61 (i.e. the reflective properties of the rear surface 54 can include reflectivity, light absorption, light scattering, and/or the like, the strength of which increases further away from the first light source 61). In certain examples, the light guide 52 defines a cavity (not shown) that receives the light and vertically upwardly guides the light from the lighting source 61. The light guide 52 can be made of any suitable transparent or translucent material such as plastic, glass, and the like.

Figure 6:
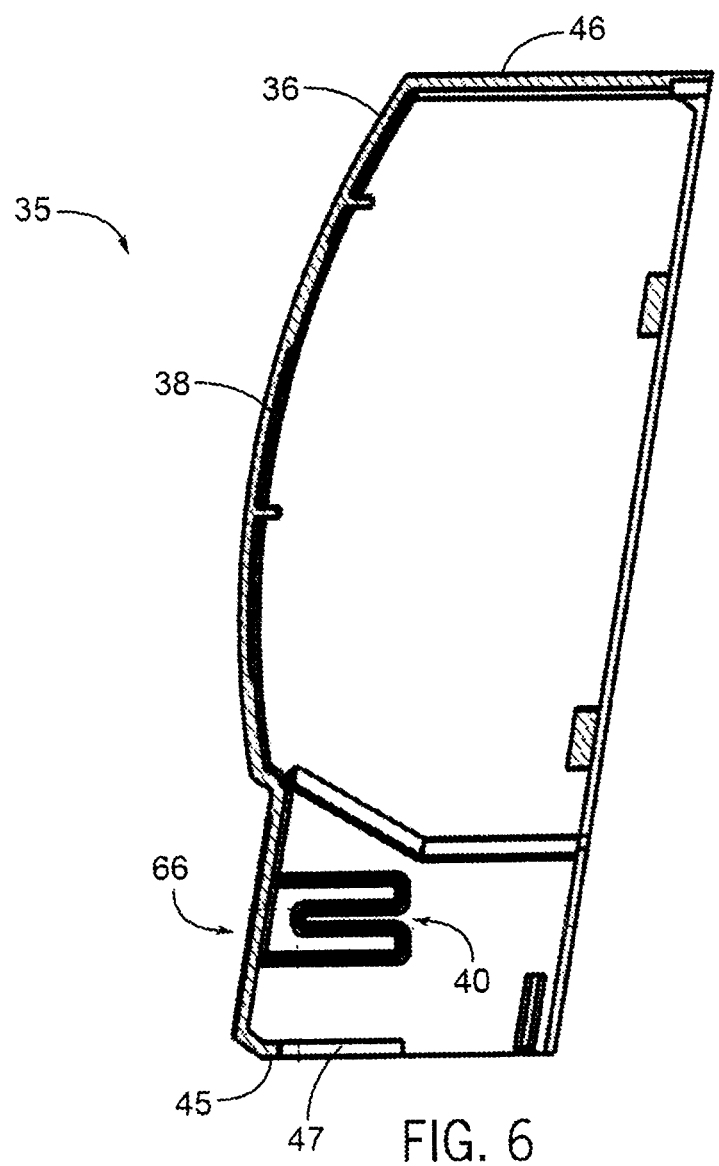
FIG. 6 is a cross section view of the housing of FIG. 5.
Figure 7:
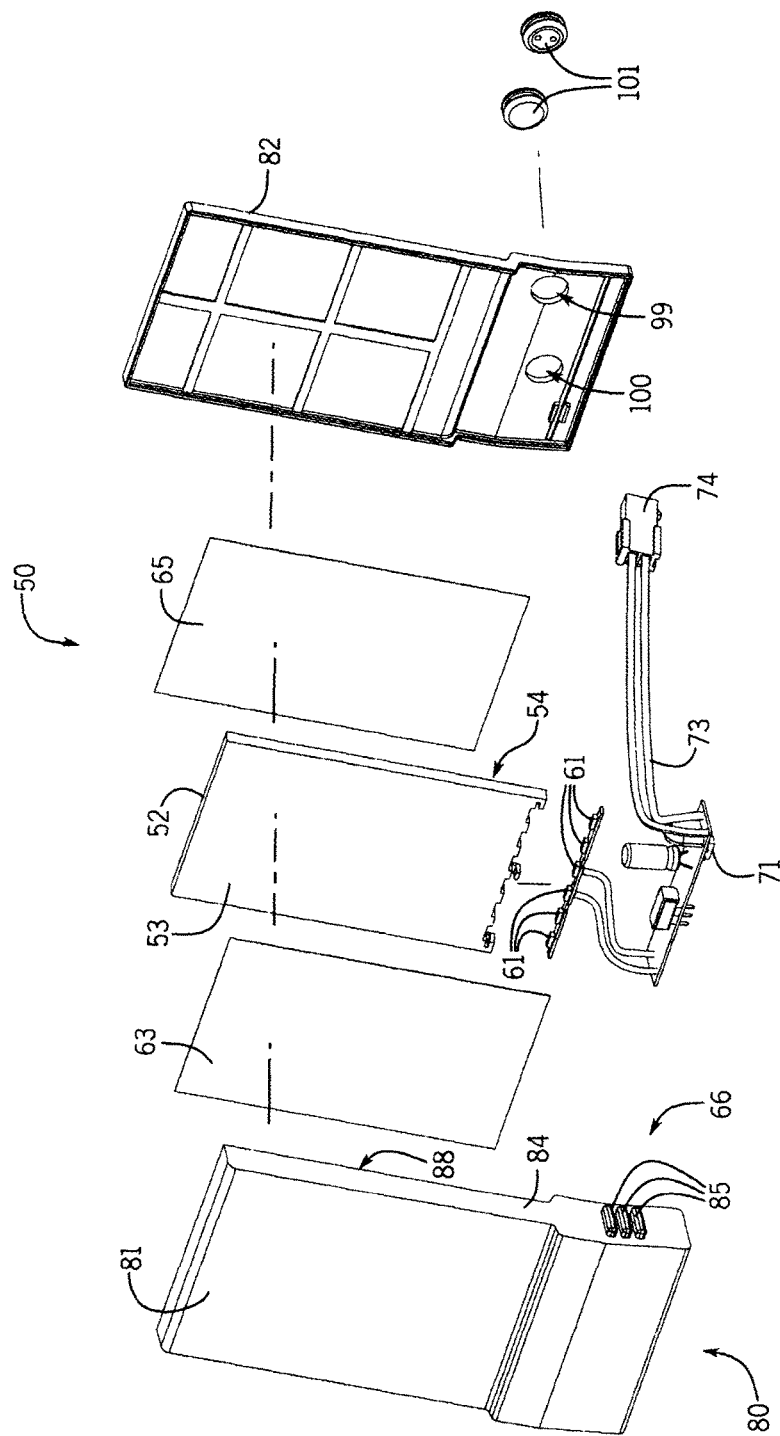
FIG. 7 is an exploded view of an example lighting module.
Figure 8:
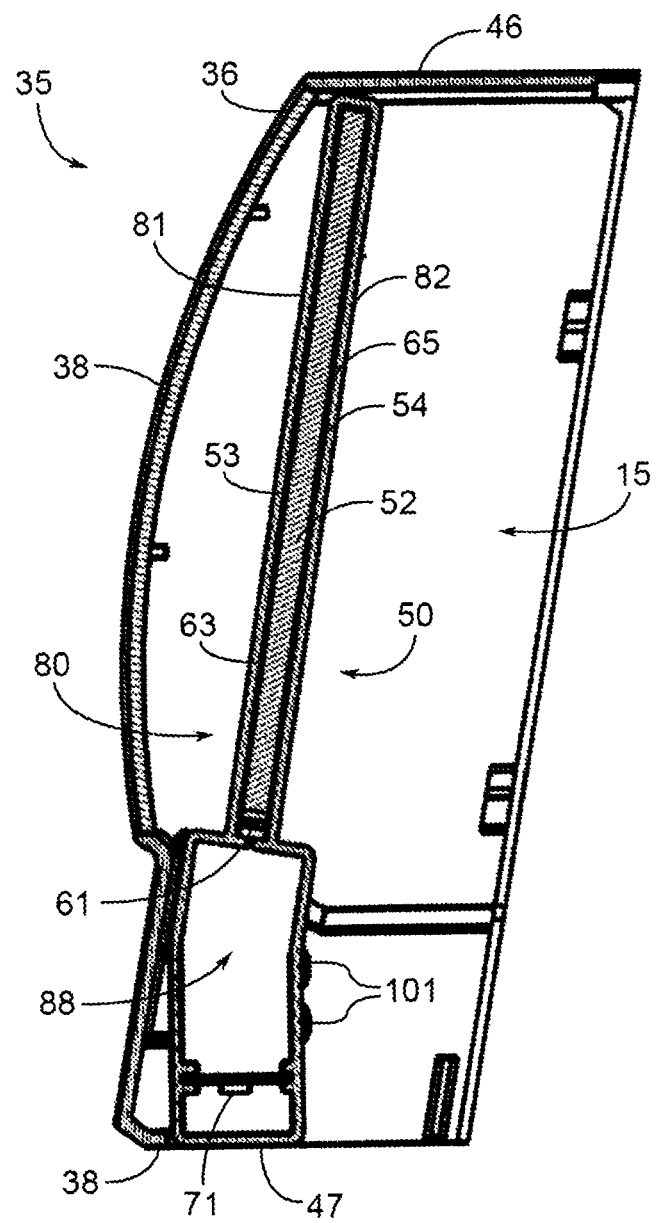
FIG. 8 is a cross section view of the example housing of FIG. 5 and the lighting module of FIG. 7.
Figure 9:
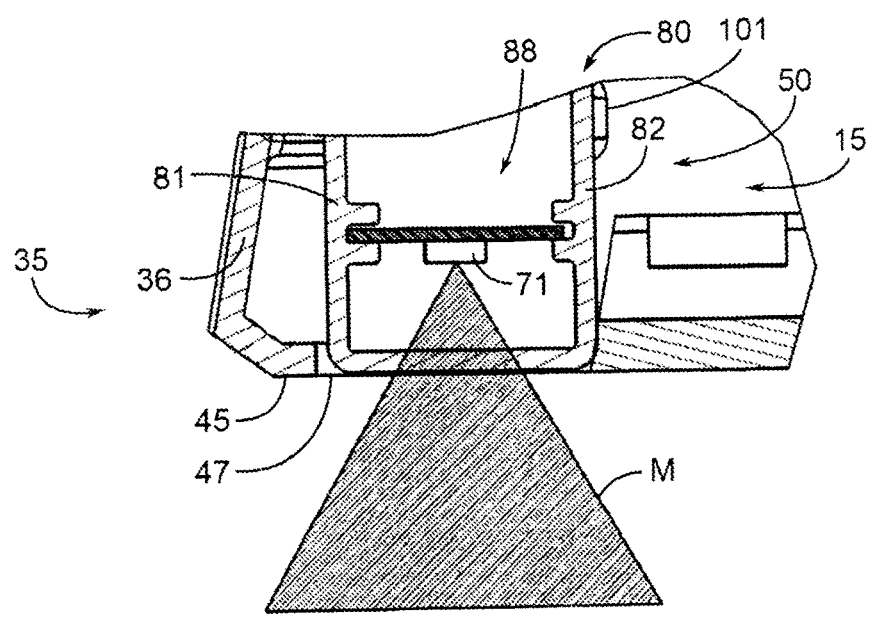
FIG. 9 is an enlarged view along line 9-9 in FIG. 3.
Figure 10:
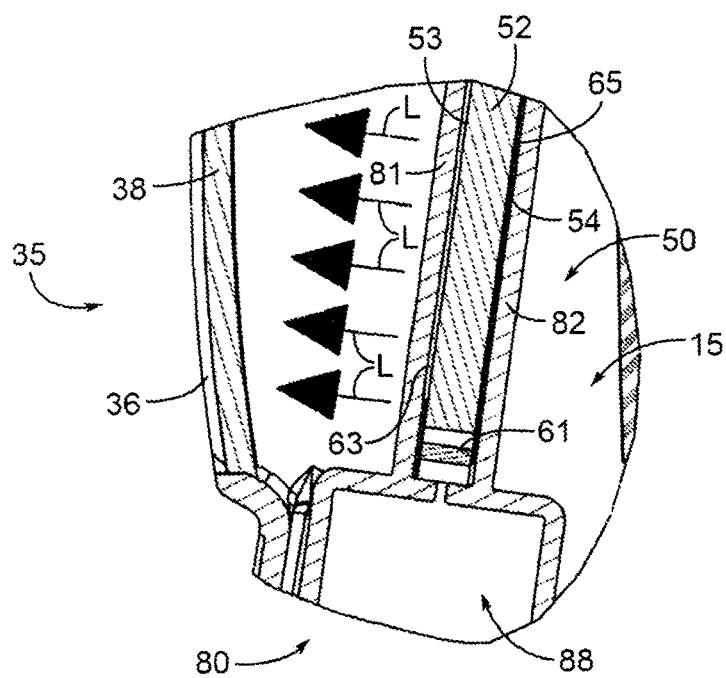
FIG. 10 is an enlarged view along line 10-10 in FIG. 3.
Figure 11:
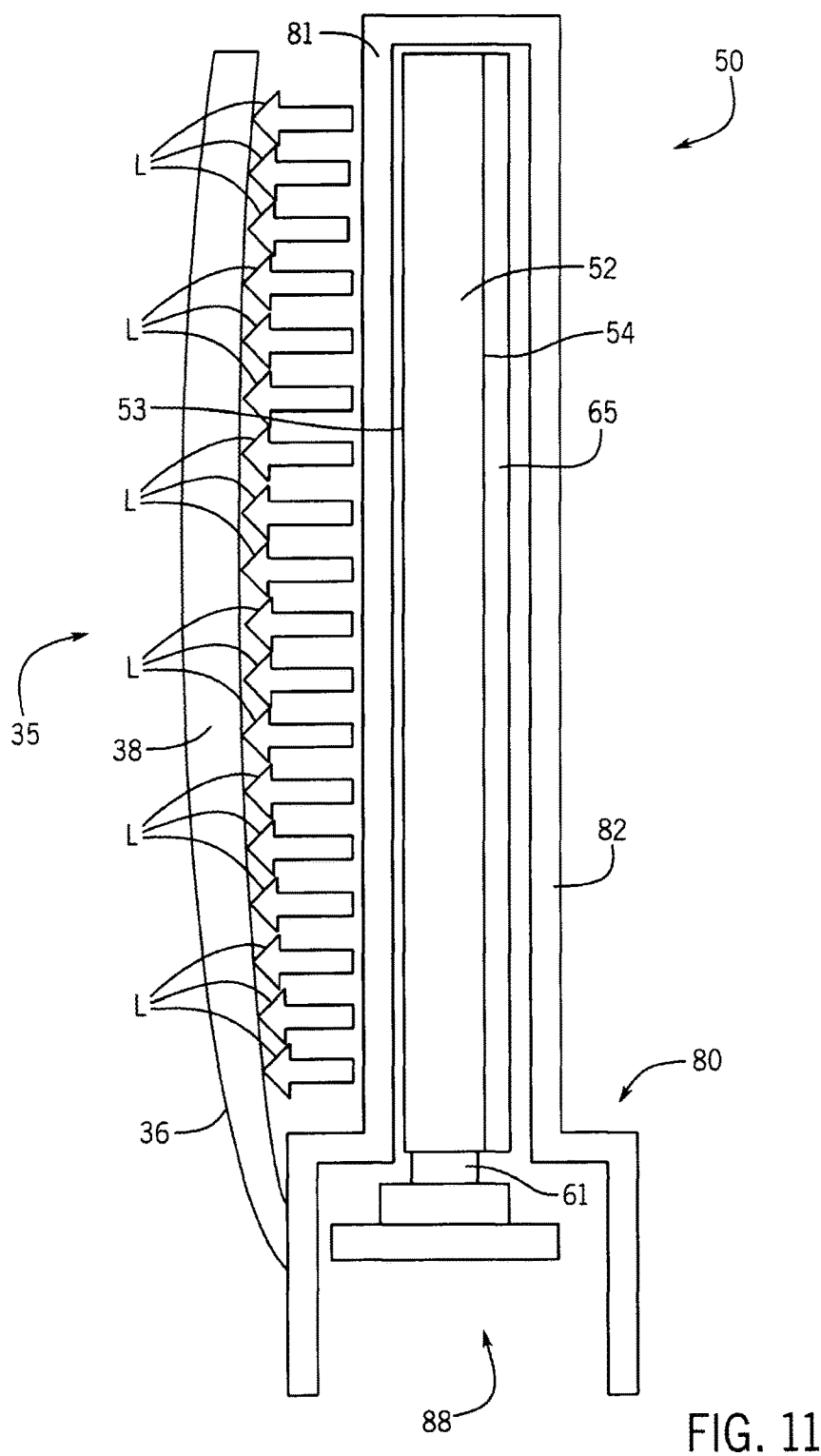
FIG. 11 is a side view of an example lighting module and a front of a housing.

The lighting module 50 is removably coupled to the housing 35 by a manually operable mating connection 66 (FIGS. 6-7). The mating connection 66 includes a boss 85 (FIG. 7) on one of the lighting module 50 and the housing 35 and a channel 40 (FIGS. 5-6) defined in the other of the lighting module 50 and the housing 35. The channel 40 is configured to receive the boss 85. In the example depicted in FIGS. 5-7, the boss 85 is on the lighting module 50 and the channel 40 is defined in the housing 35.

Figure 12:
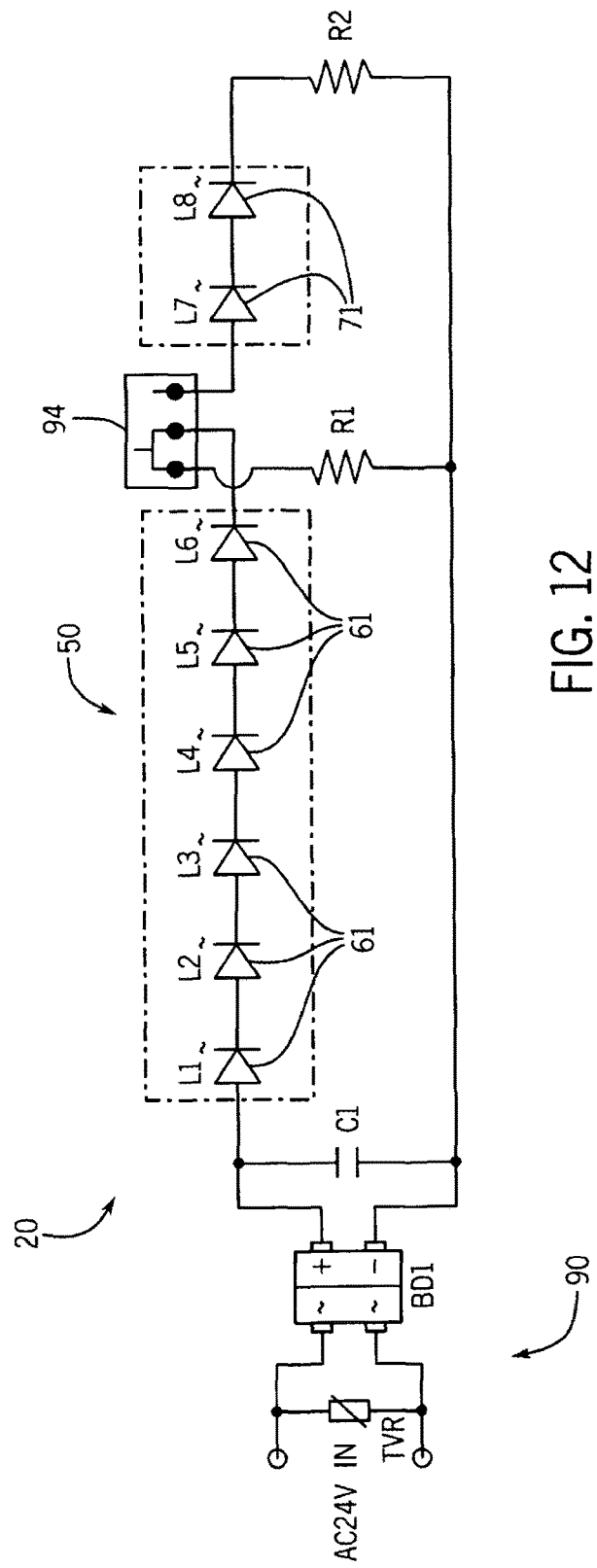
FIG. 12 is an example circuit diagram.
Figure 13:
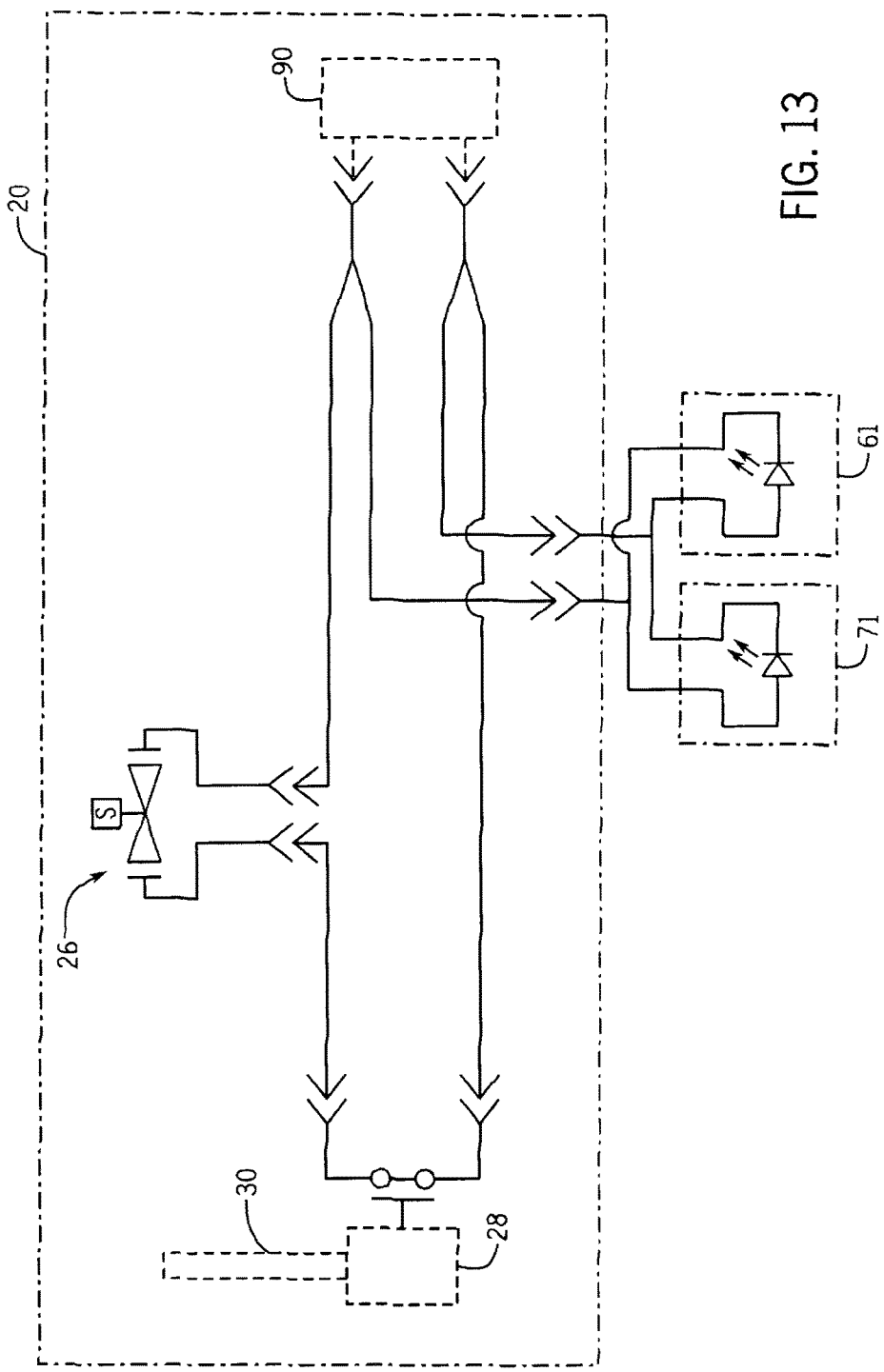
FIG. 13 is an example circuit diagram.

The lighting module 50 is further electrically coupled to the dispensing head 20 by a manually operable electrical connection 73 (FIG. 7). The electrical connection 73 couples to lighting module 50 to the electrical circuit that receives power for a power source 90 (FIGS. 12-13) and that is electrically coupled to the valve 26 (FIGS. 12-13). In the example depicted in FIG. 7, the electrical connection 73 is a wire harness that has a male connection end 74 that is configured to mate with a female connection receiver (not shown) on the dispensing head 20 (FIG. 4).

Referring to FIG. 7, the lighting module 50 includes a casing 80 that defines a cavity 88 that receives the light guide 52, the first light source 61, and/or the second light source 62 to thereby protect and seal the light guide 52, the first light source 61, and/or the second light source 62 from contaminants and moisture. The casing 80 includes a front panel 81 and a rear panel 82 opposite the front panel 81 that hermetically seals with the front panel 81. The front panel 81 includes a pair of opposing sides 84 that extend toward the rear panel 82. The front panel 81 is configured to allow light to travel from the light guide 52 to the display window 38 and/or the lighting opening 47. The panels 81, 82 can include transparent, translucent, and/or opaque sections.

The rear panel 82 defines an opening 99 that allows the electrical connection 73 to be received there through while still maintaining the hermetic seal with the front panel 81. The rear panel 82 also defines an access opening 100 that receives a removable grommet 101. The grommet 101 can be removed to allow inspection and/or maintenance to the components in the casing 80.

In certain examples, the dispensing head 20 includes a rear lighting module 51 (FIG. 3) configured to illuminate the rear display window 44 of the rear 42. The rear lighting module 51 is similar to the lighting module 50 and can include any of the components described with reference to the lighting module 50. In certain examples, the rear lighting module 51 includes a second manual electrical connection that electrically couples the rear lighting module to the dispensing head 20.

Referring to FIGS. 12-13 example circuit diagrams for the dispensing head 20 and the lighting module 50 are shown. The lighting module 50 is coupled to the power source 90 via the electrical connection 73 (FIG. 7). In certain examples, the power source 90 is a 24 Volt AC power source. In certain examples, a slide switch 94 is included and configured to electrically uncouple to the second light source 71 from the circuit such that the second light source 71 does not emit light.

The lighting module 50 and/or the electrical circuits to which the lighting module 50 is coupled via the electrical connection 73 can include electrical devices and/or components which vary the operation of the lighting module 50 (i.e. various electrical devices may cause the light sources 61, 71 to blink, dim, gradually illuminate, and/or perform other functions).

What is claimed is:

1. A beverage dispensing head comprising:
    a housing having a front with a display window, a rear, and a base with a lighting opening, wherein the base extends between the front and the rear and wherein the housing defines a cavity;
    a mixing nozzle coupled to the base and configured to dispense a flow of beverage via the base;
    a valve disposed in the cavity and configured to control the flow of beverage via the mixing nozzle;
    a switch movable to open the valve to thereby open the flow of beverage via the mixing nozzle and close the valve to thereby close the flow of beverage via the mixing nozzle; and
    a lighting module disposed in the cavity and configured to illuminate the display window, the lighting opening, and the flow of beverage via the mixing nozzle when the switch is moved to open the valve, the lighting module having a first light source that emits light toward the display window, a light guide that vertically upwardly guides light from the first light source alongside the display window, a second light source that emits light toward the lighting opening, and a reflective rear surface that reflects light emitted from the first light source toward the display window and has a reflective property that increases as the reflective rear surface extends away from the first light source.

2. The beverage dispensing head according to claim 1, wherein the display window is separated from the lighting opening.

3. The beverage dispensing head according to claim 2, wherein the display window is curved so as to form a lens for focusing light from the lighting module.

4. The beverage dispensing head according to claim 2, wherein the light guide forms a cavity for receiving the light and for vertically upwardly guiding the light from the first light source; and wherein the light guide further comprises a front surface for dispersing the light towards the display window.

5. The beverage dispensing head according to claim 4, wherein light guide extends alongside a majority of the display window.

6. The beverage dispensing head according to claim 2, further comprising a lever coupled to and extending from the base of the housing and wherein the lighting opening is oriented towards a point of dispense for the flow of beverage so that via the lighting opening the lighting module illuminates a beverage receptacle as the beverage receptacle is pressed against the lever and receives the flow of beverage.

7. The beverage dispensing head according to claim 1, wherein the lighting module is removably attached to the housing by a manually operable mating connection and to the valve by a manually operable electrical connection.

8. The beverage dispensing head according to claim 7, wherein the manually operable mating connection comprises a boss on one of the lighting module and housing and a channel on the other of the lighting module and housing.

9. The beverage dispensing head according to claim 7, wherein the manually operable electrical connection comprises a wire harness.

10. The beverage dispensing head according to claim 1, wherein the housing, mixing nozzle, valve, switch, and lighting module form a dispensing head combination that is one of a plurality of identical dispensing head combinations for dispensing different beverages, wherein the plurality of identical dispensing head combinations together form a beverage dispensing station.

11. The beverage dispensing head according to claim 1, further comprising a rear lighting module disposed in the cavity and configured to illuminate the rear of the housing when the switch is moved into the closed position.

12. The beverage dispensing head according to claim 11, wherein the rear of the housing comprises a rear display window; and wherein the rear lighting module is configured to illuminate the rear display window.

13. A discrete beverage dispensing head comprising:
- a housing defining a cavity and having a front, a rear opposite the front, and a base extending between the front and the rear;
- a mixing nozzle coupled to the base and configured to dispense a flow of beverage via the base;
- a valve disposed in the cavity and configured to control the flow of beverage via the mixing nozzle;
- a switch movable to open the valve to thereby open the flow of beverage via the mixing nozzle and close the valve to thereby close the flow of beverage via the mixing nozzle; and
- a lighting module disposed in the cavity and configured to illuminate the front and the base when the switch is moved into the closed position, the lighting module having a first light source that emits light toward the front, a second light source that emits light toward the base, and a casing defining a casing cavity in which the first light source and the second light source are received and hermetically sealed;
- wherein the front is removable such that the lighting module can be received in the cavity and the casing coupled to the housing.

14. The discrete beverage dispensing head according to claim 13, wherein the casing has a front casing panel and an opposite, rear casing panel, and wherein the lighting module has a wire harness that extends away from the rear casing panel to thereby electrically couple the lighting module to the discrete beverage dispensing head.

15. The discrete beverage dispensing head according to claim 14, wherein the lighting module has a boss configured to contact the housing as the lighting module is received into the cavity.

16. The discrete beverage dispensing head according to claim 13, wherein the lighting module has a light guide that vertically upwardly guides light from the first light source alongside the display window, and a reflective rear surface that reflects light emitted from the first light source toward the display window and has a reflective property that increases as the reflective rear surface extends away from the first light source.

\* \* \* \* \*